United States Patent
Lovisa et al.

(10) Patent No.: US 7,805,072 B2
(45) Date of Patent: Sep. 28, 2010

(54) WAVELENGTH DIVISION MULTIPLEX OPTICAL RING NETWORK FOR TRANSMITTING PROTECTED SIGNALS BY LOCAL STATE SWITCHING FOLLOWING LOCAL INTERRUPTION DETECTION

(75) Inventors: Stéphane Lovisa, Paris (FR); Fabio Tassara, Milan (IT); Francesco Shiavoni, Palaiseau (FR)

(73) Assignee: Alcatel, Paris (FR)

(*) Notice: Subject to any disclaimer, the term of this patent is extended or adjusted under 35 U.S.C. 154(b) by 678 days.

(21) Appl. No.: 10/874,281

(22) Filed: Jun. 24, 2004

(65) Prior Publication Data

US 2004/0264966 A1    Dec. 30, 2004

(30) Foreign Application Priority Data

Jun. 30, 2003    (FR)    .................................... 03 07883

(51) Int. Cl.
G02B 6/293 (2006.01)
G02B 6/26 (2006.01)
H04B 10/08 (2006.01)

(52) U.S. Cl. .................. 398/4; 398/59; 398/5; 398/180
(58) Field of Classification Search ................. 398/180, 398/59, 3, 4–5
See application file for complete search history.

(56) References Cited

U.S. PATENT DOCUMENTS

| | | | | |
|---|---|---|---|---|
| 5,003,531 | A * | 3/1991 | Farinholt et al. | 370/223 |
| 5,442,623 | A * | 8/1995 | Wu | 370/224 |
| 5,446,725 | A * | 8/1995 | Ishiwatari | 370/222 |
| 5,647,035 | A * | 7/1997 | Cadeddu et al. | 385/24 |
| 5,959,749 | A * | 9/1999 | Danagher et al. | 398/83 |
| 6,069,719 | A * | 5/2000 | Mizrahi | 385/24 |
| 6,088,141 | A * | 7/2000 | Merli et al. | 398/5 |
| 6,122,249 | A * | 9/2000 | Mochizuki et al. | 370/220 |
| 6,198,721 | B1 * | 3/2001 | Mueller | 370/223 |
| 6,233,074 | B1 * | 5/2001 | Lahat et al. | 398/79 |
| 6,243,512 | B1 * | 6/2001 | Rettenberger et al. | 385/24 |
| 6,249,510 | B1 * | 6/2001 | Thompson | 370/223 |
| 6,320,684 | B2 * | 11/2001 | Uehara | 398/7 |
| 6,414,765 | B1 * | 7/2002 | Li et al. | 398/5 |

(Continued)

OTHER PUBLICATIONS

R. Cadeddu et al, "An Optical Bidirectional Self-healing Ring with Increased Capacity Using WDM", 22$^{ND}$ European Conference on Optical Communication, ECOC'96, vol. 3, Sep. 15, 1996, pp. 257-260,m XP010303108.

Primary Examiner—Ken N Vanderpuye
Assistant Examiner—Danny W. Leung
(74) Attorney, Agent, or Firm—Sughrue Mion, PLLC

(57) ABSTRACT

Wavelength division multiplex ring communication network equipment comprises a first multiplexer connected to a first optical fiber portion dedicated to transporting multiplexed signals and a second multiplexer connected to a second optical fiber portion. The equipment comprises signal protection circuitry connected to the first and second multiplexers and to a terminal which, in the event of local detection of interruption of signal transmission at a first wavelength on the first optical fiber portion, send the signals coming from the terminal to the second multiplexer at a second wavelength so that it communicates them to the second optical fiber portion, and sends to the terminal the signals that are addressed to it and that come from the second optical fiber portion at the second wavelength.

6 Claims, 3 Drawing Sheets

U.S. PATENT DOCUMENTS

| | | |
|---|---|---|
| 6,414,771 B2 * | 7/2002 | Al-Salameh et al. .......... 398/48 |
| 6,477,288 B1 * | 11/2002 | Sato ............................ 385/16 |
| 6,504,963 B1 * | 1/2003 | Fang et al. ................... 385/16 |
| 6,579,018 B1 * | 6/2003 | Li et al. ......................... 398/4 |
| 6,583,900 B2 * | 6/2003 | Onaka et al. ................. 398/59 |
| 6,657,952 B1 * | 12/2003 | Shiragaki et al. ............ 370/223 |
| 6,661,972 B1 * | 12/2003 | Arecco .......................... 398/3 |
| 6,701,085 B1 * | 3/2004 | Muller ........................... 398/3 |
| 6,771,849 B1 * | 8/2004 | Fang et al. ................... 385/16 |
| 6,771,852 B2 * | 8/2004 | Hemenway et al. .......... 385/24 |
| 6,807,190 B1 * | 10/2004 | Kremer ....................... 370/452 |
| 6,895,183 B2 * | 5/2005 | Shimomura et al. .......... 398/34 |
| 6,904,542 B2 * | 6/2005 | Ryhorchuk et al. ........... 714/27 |
| 6,920,508 B1 * | 7/2005 | Muller ....................... 709/251 |
| 6,947,670 B1 * | 9/2005 | Korotky et al. ............... 398/59 |
| 6,973,267 B1 * | 12/2005 | Arecco et al. .................. 398/4 |
| 7,003,189 B1 * | 2/2006 | Fang et al. ................... 385/16 |
| 7,016,610 B2 * | 3/2006 | Xiao et al. .................... 398/83 |
| 7,035,540 B2 * | 4/2006 | Finan et al. ................... 398/59 |
| 7,072,580 B2 * | 7/2006 | Arecco et al. .................. 398/4 |
| 7,133,609 B2 * | 11/2006 | Kim et al. ...................... 398/3 |
| 7,161,898 B1 * | 1/2007 | Mazzurco et al. ............ 370/217 |
| 7,280,470 B2 * | 10/2007 | Shiragaki et al. ............ 370/223 |
| 7,283,740 B2 * | 10/2007 | Kinoshita et al. .............. 398/5 |
| 7,343,093 B2 * | 3/2008 | Oberg et al. ................... 398/3 |
| 7,400,828 B1 * | 7/2008 | Oren et al. ..................... 398/3 |
| 7,420,922 B2 * | 9/2008 | Bruckman et al. .......... 370/236 |
| 7,421,197 B2 * | 9/2008 | Palacharla et al. ............. 398/5 |
| 2001/0028757 A1 * | 10/2001 | Lee et al. ...................... 385/24 |
| 2002/0018616 A1 * | 2/2002 | Li ................................ 385/24 |
| 2002/0048066 A1 * | 4/2002 | Antoniades et al. ......... 359/128 |
| 2003/0025956 A1 * | 2/2003 | Li et al. ...................... 359/110 |
| 2003/0156840 A1 * | 8/2003 | Uchikata ........................ 398/7 |
| 2004/0109684 A1 * | 6/2004 | Joo et al. ........................ 398/7 |
| 2004/0131353 A1 * | 7/2004 | Cannon et al. ................. 398/1 |
| 2004/0151499 A1 * | 8/2004 | Ibukuro et al. ................ 398/45 |
| 2004/0228631 A1 * | 11/2004 | Mantin et al. ................. 398/83 |
| 2004/0264966 A1 * | 12/2004 | Lovisa et al. ................. 398/83 |
| 2009/0022489 A1 * | 1/2009 | Way ............................... 398/4 |

* cited by examiner

WAVELENGTH DIVISION MULTIPLEX OPTICAL RING NETWORK FOR TRANSMITTING PROTECTED SIGNALS BY LOCAL STATE SWITCHING FOLLOWING LOCAL INTERRUPTION DETECTION

CROSS-REFERENCE TO RELATED APPLICATIONS

This application is based on French Patent Application No. 03 07 883 filed Jun. 30, 2003, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of wavelength division multiplex (WDM) optical ring communication networks and more particularly to protecting the transmission of signals in such networks in the event of interruption of transmission.

2. Description of the Prior Art

Several solutions have been proposed to enable transmission of signals to continue in an optical ring network in the event of a problem affecting the transmission optical fibers or other transmission components.

The "1+1 O-SNCP" solution was developed for WDM networks. It consists in providing first and second pairs of monodirectional optical fibers and transmitting the same multiplexed signals in opposite directions (called "East" and "West") in the first pair of fibers and in the second pair of fibers. The network equipments at the ends of connections defined by the first and second optical fiber pairs concern themselves only with signals that reach them from one of the two directions, for example the East direction. If one of these equipments detects an interruption in transmission of the signal in the East direction, it changes direction and no longer concerns itself with signals other than signals that reach it from the West direction.

A solution of this kind is very secure but is particularly costly because it entails doubling the number of transponders in each network equipment and uses at least twice the bandwidth.

The Shared Protection Ring (SPRing) solution was developed for SDH networks. A Multiplex Section SPRing (MS-SPRing) version dedicated to the transmission of multiplexed signals is defined by ITU-T standard G.841. It consists in connecting the network equipments two by two using two monodirectional optical fibers dedicated to transporting time division multiplexed signals. In normal operation, the signals circulate in the optical fibers at a first wavelength. If one of the equipments detects an interruption of signal transmission in the optical fiber sections to which it is connected, it integrates warning bytes conforming to the "K-byte" protocol into the header of the SDH signals (or messages) that contain the data. These bytes request the equipment at the opposite end of the connection to transmit its signals on the optical fibers in a direction opposite to the previous direction, by reconfiguring its transponders.

It is difficult to apply this mode of operation to WDM networks and more particularly to WDM metropolitan area networks in which signals of different types coexist and do not always have a header. It would certainly be possible to use a dedicated Optical Supervisory Channel (OSC) to enable the equipments to exchange frames, equivalent to SDH headers (32 bytes), comprising warning messages. However, this would monopolize transmission resources of the network and would entail developing new transponders, which could prove time-consuming and costly.

What is more, this second solution uses a relatively slow protection mechanism since it necessitates sending information back from one end to the other of each faulty connection.

There being no entirely satisfactory prior art solution, an object of the invention is therefore to improve on the situation.

SUMMARY OF THE INVENTION

To this end the invention proposes wavelength division multiplex ring communication network equipment comprising a first multiplexer connected to a first optical fiber portion dedicated to transporting multiplexed signals and a second multiplexer connected to a second optical fiber portion, the equipment comprising signal protection means connected to the first and second multiplexers and to a terminal and adapted, in the event of local detection of interruption of signal transmission at a first wavelength on the first optical fiber portion, to send the signals coming from the terminal to the second multiplexer at a second wavelength, so that it communicates them to the second optical fiber portion in a direction opposite to the usual direction, and to transmit to the terminal the signals that are addressed to it and that come from the second optical fiber portion at the second wavelength, which signal protection means comprise signal distribution means connected to the terminal, first and second action means connected to the signal distribution means and to the first and second multiplexers, respectively, and adapted to assume a first or transit state or a second or add/drop state for adding/dropping signals at the second wavelength as a function of local state instructions, the action means assuming by default their first transit state, and first add/drop means for signals, connected to the signal distribution means, the first multiplexer, and the first and second action means, and adapted in the event of local detection of signal interruption to send the first and second action means local state instructions so that they assume said second add/drop state.

Accordingly, if the equipment is on the path of signals circulating in the optical fiber at the second wavelength, but is not at the end of a portion of optical fibers affected by a transmission interruption, there is no need to reconfigure it. The first and second action means then automatically forward the signals at the second wavelength that they receive from the optical fiber before reinjecting them into the fiber, still at the second wavelength, in the direction of the next equipment.

The advantage of this is that there is no need to exchange a warning message of any kind whatsoever between the various equipments of the network. Reconfiguration is therefore effected locally and without external intervention, where it is necessary.

Also, the signal protection means may equally comprise third coupling means connecting said distribution means to said first add/drop means and to said first and second action means for exchange of signals between said terminal and said optical fiber portions via said first and second multiplexers, respectively.

If the equipment is connected to two equipments via second and first optical fiber portions, via its respective first and second multiplexers, instead of to a single other equipment, when they detect locally an interruption of signal transmission at a third wavelength (possibly identical to the first wavelength) on the second optical fiber portion, their signal protection means preferably either transmit the signals coming from the terminal to the first multiplexer on a fourth wavelength (which may be identical to the second wavelength), in order to communicate them to the first optical fiber portion (in a direction opposite to the usual direction), or transmit to the terminal the signals at the second wavelength that come from the first optical fiber portion and are intended for it.

In this situation, the signal protection means may comprise second add/drop means for signals having the third wavelength, connected to the signal distribution means, the second multiplexer and the first and second action means, and adapted, if they detect locally an interruption of the signal at the third wavelength, to send the first and second action means local state instructions so that they change state, i.e. so that they assume said second add/drop state.

The signal protection means may then equally comprise fourth coupling means connecting the second signal add/drop means to the first and second action means, in order to send them selectively the local state instructions.

The invention is particularly suitable, although not exclusively so, for WDM ring metropolitan area networks.

Other features and advantages of the invention will become apparent on examining the following detailed description and the appended drawings.

DETAILED DESCRIPTION OF THE PREFERRED EMBODIMENTS

The appended drawings may constitute part of the description of the invention as well as, if necessary, contributing to the definition of the invention.

The object of the invention is to protect the transmission of signals in wavelength division multiplex (WDM) optical ring networks.

Hereinafter, it is considered that the WDM ring network is of the metropolitan area network type. The invention is not limited to this type of network, however. In particular, it relates equally to long-haul links having a ring topology.

Figure 1:
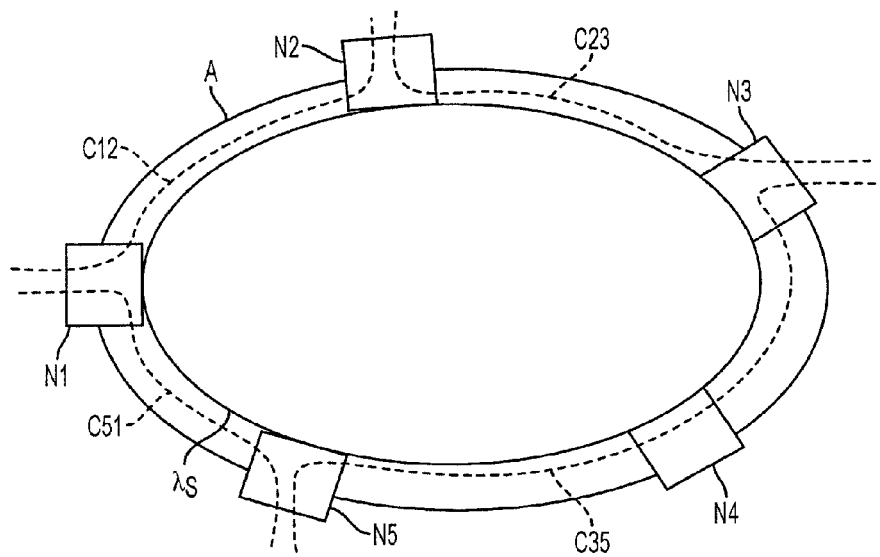
FIG. 1 is a highly schematic illustration of one example of a WDM ring network when operating normally.

As shown highly schematically in FIG. 1, a WDM ring network comprises one or more optical fibers, here represented by a ring A, dedicated to the multiplexed transmission of signals in opposite directions, and network equipments (also known as stations) Ni (here i=1 to 5) connected to the optical fibers.

Each network equipment Ni serves as an interface between the WDM ring network and a communication terminal T (see FIG. 2) that may serve as an entry point (or access server) to another network or subnetwork (whether optical or not).

Within a WDM ring network, network equipments Ni may exchange data (in the form of optical signals) only when connections have been set up between them via the optical fiber(s). In the example shown in FIG. 1, four equipments N1, N2, N3 and N5 have set up respective connections C12, C23, C35 and C51 in this way, two by two and via fiber portions, enabling them to exchange optical signals having at least a first "working" wavelength $\lambda w$.

For example, if the ring comprises two fibers F1, F2, the equipment N1 transmits signals having the first wavelength $\lambda w$ to the equipment N5 using the second fiber F2 (here dedicated to the counterclockwise transmission direction that is referred to as the "East direction"), while the equipment N5 transmits signals also having the first wavelength $\lambda w$ to the equipment Ni using the first fiber F1 (here dedicated to the clockwise transmission direction that is referred to as the "West direction").

It is important to note that an equipment Ni may be connected to a plurality of equipments with which it exchanges signals having wavelengths that may be different. Of course, the simplest case would be that in which the same wavelength $\lambda w$ is used and a single fiber is used for transmission in both directions.

Figure 2:
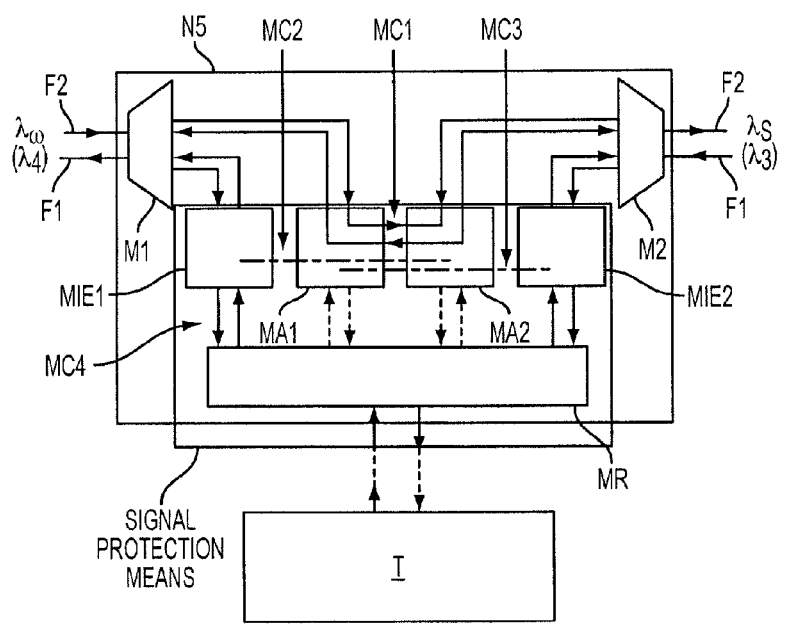
FIG. 2 is a schematic illustration of one embodiment of a network equipment according to the invention when operating normally.

As shown in FIG. 2, an equipment according to the invention (for example the equipment N5 if the ring comprises two fibers F1, F2) comprises a first multiplexer M1 connected to first portions of the optical fibers F1 and F2 (which here correspond to the connection C51) and a second multiplexer M2 connected to second portions of the optical fibers F1 and F2 (which here correspond to the connection C35).

In the example shown, the equipment N5 being connected to two other equipments N1 and N3, each of its multiplexers M1 and M2 is connected to a signal add/drop module MIE1, MIE2. The term "multiplexer" used here must be understood as designating a device adapted to combine a plurality of optical signals coming from the equipment and to separate a plurality of optical signals carried by different wavelengths coming from the fibers. They may therefore be multiplexer/demultiplexer components or arrangements made up of simple couplers (for combining signals) and filters (for separating signals).

Each signal add/drop module MIE1, MIE2 takes the form of a transponder electronic circuit card, for example, adapted to feed, firstly, the multiplexer M1, M2 to which it is connected with signals at the first wavelength $\lambda w$ and coming from the terminal T, in order for them to be inserted into a multiplex ("added"), and, secondly, the terminal T to which their equipment N5 is connected with signals having the first wavelength $\lambda w$, extracted ("dropped") from the multiplexer M1, M2 to which it is connected.

Of course, if an equipment Ni has set up only one connection with another equipment Nj, it uses only one add/drop module MIE connected to the multiplexer M that is connected to the optical fiber portions connected to the other equipment Nj.

Each equipment Ni according to the invention also comprises first and second action modules MA1 and MA2 providing a transit function for signals at a second wavelength $\lambda s$ and an add/drop function for signals at the second wavelength $\lambda s$, according to the state in which they are placed. This second wavelength $\lambda s$ then constitutes a standby wavelength.

Each action module MA1, MA2 takes the form of a transponder electronic circuit card, for example, connected to the first or second multiplexer M1 or M2 and adapted, firstly, to supply it with signals at the second wavelength $\lambda s$ and coming from the terminal T and, secondly, to extract signals at the second wavelength $\lambda s$ addressed to the terminal T.

Moreover, the action modules MA1 and MA2 are connected to each other by coupling means MC1 to provide their first function of handling signals in transit at the second wavelength $\lambda s$. This first function may consist in a regeneration function, with or without conversion via the electrical domain. The particular case of the transit function by regeneration with conversion to the electrical domain is considered in the remainder of the description by way of example. The coupling means MC1 are then essentially electrical connection means.

Each add/drop module MIE1, MIE2 is further connected by connection means MC2, MC3 to the two action modules MA1 and MA2 in order to send them local state change instructions (see below).

The connection means MC1, MC2 and MC3 are preferably implemented in the back panel of the equipment Ni.

Finally, each equipment Ni also includes a signal distribution module MR connected, firstly, to the terminal T and, secondly, by coupling means MC4, to the add/drop modules MIE1 and MIE2 and to the action modules MA1 and MA2.

The distribution module MR supplies the add/drop modules MIE1 and MIE2 and the action modules MA1 and MA2 with signals coming from the terminal T, according to their destination, and collect the signals extracted by the add/drop modules MIE1 and MIE2 and the action modules MA1 and MA2, at the level of their respective multiplexes M1 and M2, and addressed to the terminal T.

As previously indicated, an object of the invention is to protect the transmission signals within the WDM ring network.

To this end, each add/drop module MIE1, MIE2 observes the traffic of the first or second portions of optical fibers F1 and F2 to which its multiplexer M1 or M2 is connected. In other words, in the example shown, the add/drop module MIE1 of the equipment N5 observes the traffic on the connection C51 and the add/drop module MIE2 of the equipment N5 observes the traffic on the connection C35.

If the traffic observed by the add/drop modules MIE1 and MIE2 is normal, then the action modules MA1 and MA2 are both placed in their first or transit state, as shown in FIG. 2. This first or transit state is the default state of the action modules of all the equipments Ni of the WDM ring network, for reasons explained later.

In this first state, the action modules MA1 and MA2 are connected to each other by the coupling means MC1.

Figure 3:
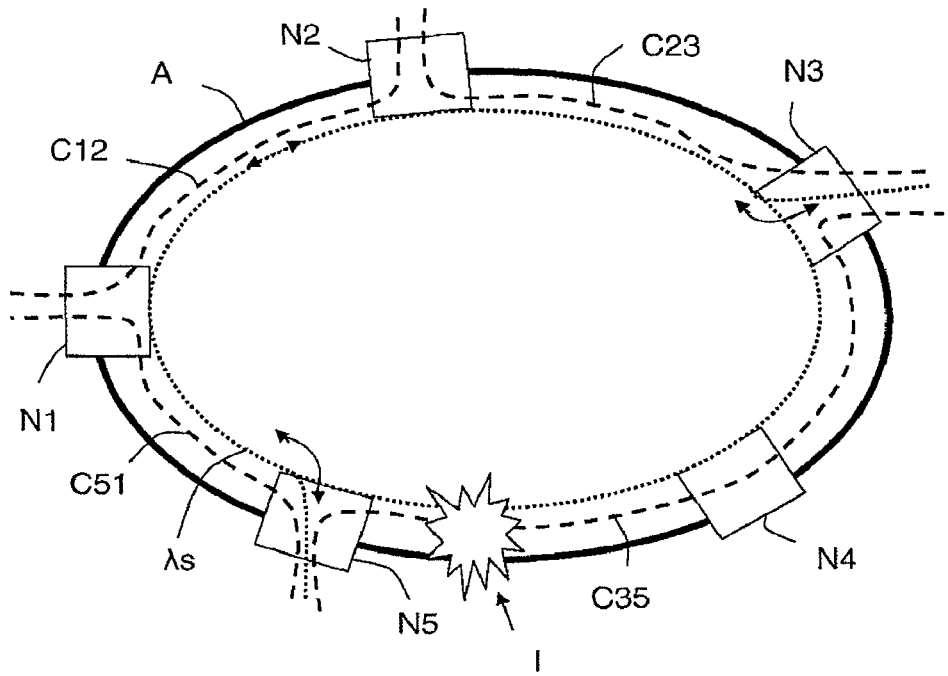
FIG. 3 illustrates the operation of the WDM ring network from FIG. 1 in the event of a break in a portion of the optical fibers between two network equipments.

On the other hand, if one of the add/drop modules, for example the module MIE2, detects interruption of transmission of signals on the connection C35 (second portions of the optical fibers F1 and F2), as shown at I in FIG. 3, it sends the two action modules MA1 and MA2, using coupling means MC3, local instructions telling them to change state, i.e. to go from their first or transit state to their second or add/drop state.

The second add/drop module MIE2 no longer being able to provide its add/drop function, it is then in a standby state, so to speak, in which it merely observes the traffic on the second portions of the optical fibers F1 and F2. On the other hand, the first add/drop module MIE1 is able to continue to exercise its add/drop function since the traffic is not interrupted on the first portions of optical fibers F1 and F2 to which its first multiplexer is connected.

Figure 4:
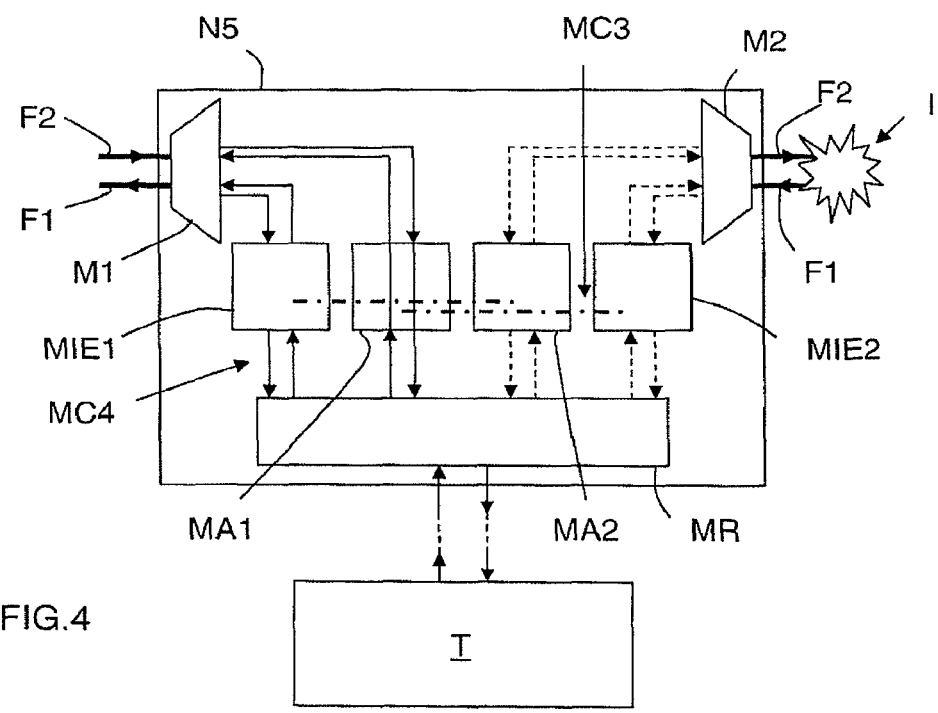
FIG. 4 illustrates the operation of the network equipment from FIG. 2 in the event of a break in the optical fiber portion to its right.

As shown in FIG. 4, only one of the two action modules (here the module MA1) is then able to exchange signals with the first multiplexer M1, given that the other action module (here the module MA2) is connected to the second multiplexer M2 which is no longer able to send or receive signals because of the interruption of the second portion of optical fibers F1 and F2.

The first action module MA1 is then ready to exercise its second add/drop function, like the first add/drop module MIE1. However, unlike the first add/drop module MIE1, which in particular feeds the first multiplexer M1 with signals which it receives from the distribution module MR and come from the terminal T at the first wavelength λw, the first action module MA1 feeds the first multiplexer M1 with signals at the second wavelength λs that it receives from the distribution module MR and come from the terminal T.

The signals coming from the terminal T and intended (here) for the equipment N3 therefore reach the distribution module MR, which sends them to the first action module MA1, which sends them to the first multiplexer M1 at the second wavelength λs. The first multiplexer M1 then integrates these signals into a multiplex that it injects into the fiber F1 in the direction of the equipment N1.

The equipment N1 not being connected to a portion of optical fibers F1, F2 that has been interrupted, it remains in its default state (shown in FIG. 2). In other words, its two action modules MA1 and MA2 remain in their first transit state, so that on receiving signals at the second wavelength λs addressed to the equipment N3 they regenerate them and then transmit them to their first multiplexer M1 so that the latter injects them, still at the second wavelength λs, into the portion of the optical fiber F1 to which it is connected, to the next equipment N2.

Just like the equipment N1, the equipment N2 is not connected to an interrupted portion of optical fibers F1, F2 and therefore remains in its default state (shown in FIG. 2). It therefore uses two action modules MA1 and MA2 to regenerate the signals received from the equipment Ni at the second wavelength λs and then injects them, still at the second wavelength λs, into the portion of the optical fiber F1 to which it is connected, leading to the next equipment N3.

Figure 5:
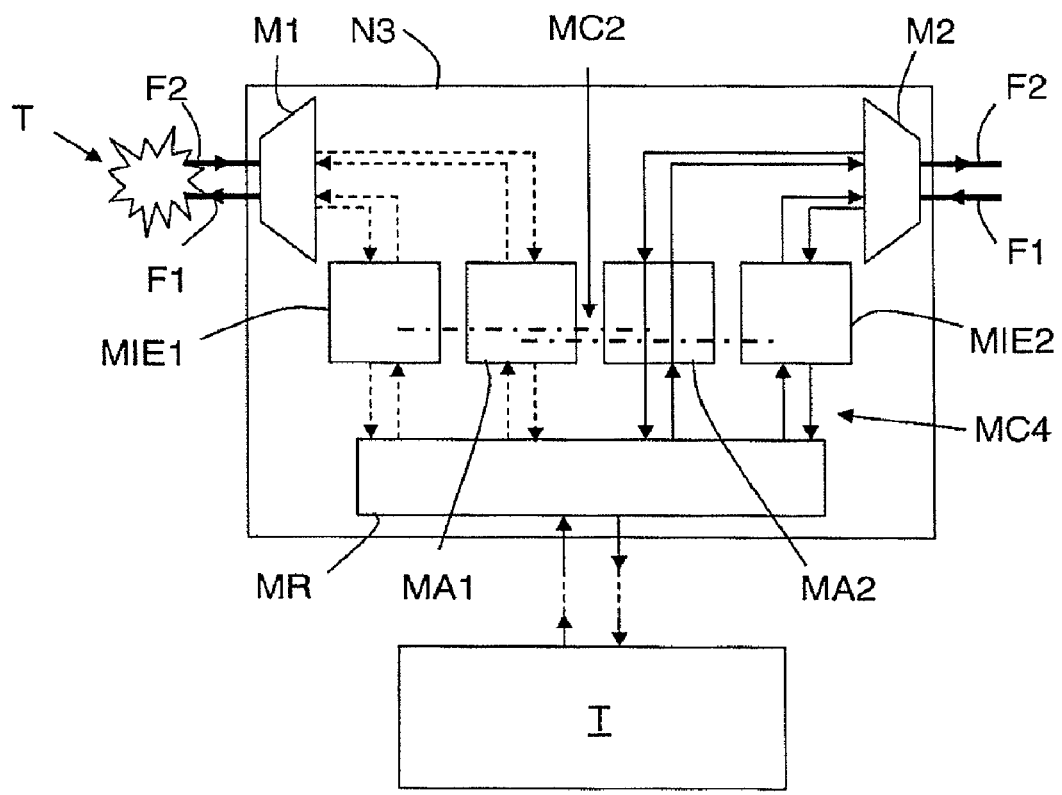
FIG. 5 illustrates the operation of the FIG. 2 network equipment in the event of a break in the optical fiber portion to its left.

In this example the next equipment N3 is connected to a (first) portion of optical fibers F1, F2 that has been interrupted. Like the equipment N5, it therefore changed state immediately its first add/drop module MIE1 detected the interruption of transmission on the connection C35 (which for it constitutes first portions of optical fibers F1, F2). This state is shown in FIG. 5.

To be more precise, when its first add/drop module MIE1 has detected the interruption in the transmission of signals on the connection C35, it sends the two action modules MA1 and MA2, via the coupling means MC2, local instructions telling them to change state, i.e. to go from their first or transit state to their second or add/drop state.

The second action module MA2 is then the only one that has become able to exchange signals with the second multiplexer M2, the first action module MA1 being connected to the first multiplexer M1 that can no longer send or receive signals because of the interruption in the first portions of optical fibers F1 or F2.

When it receives the signal at the second wavelength λs from the equipment N2, the second action module MA2 is ready to exercise its second add/drop function, like the second add/drop module MIE2. However, unlike the second add/drop module MIE2, which drops from the second multiplex M2 the signals at the first wavelength λw, the second action module MA2 drops from the second multiplexer M2 the signals at the second wavelength λs in order to send them to the transmission module MR, which then communicates them to the terminal T. Of course, the second action module MA2 also supplies the second multiplexer M2 with signals at the second wavelength λs, coming from the terminal T to which the equipment N3 is connected, and addressed to the equipment N5.

In normal operation, i.e. in the absence of the interruption I, the signals coming from the terminal T connected to the equipment N5 and (here) addressed to the equipment N3, would have reached the distribution module MR, which would have forwarded them to the second add/drop module MIE2, which would have forwarded them to the second multiplexer M2 at the first wavelength λw. The second multiplexer M2 would then have integrated the signals into a multiplex that it would then have injected into the second portion of the fiber F2, i.e. in a direction opposite to that used in protected mode. The signals injected in this way would have reached the destination equipment N3, here via the transit equipment N4, over the connection C35.

The second wavelength λs therefore serves as a protection wavelength for the first wavelength λw.

Thus, thanks to the invention, only the two equipments at the two ends of a faulty connection, i.e. at the two opposite ends of portions of optical fibers on which transmission has been interrupted, must modify their operating state locally, after having detected said interruption locally themselves. The other equipments, which are not on the path of the signals exchanged by the two equipments affected by the interruption, being by default in their transit state, they are therefore able to regenerate the signals that they receive and then relay them to the next equipment. In other words, no warning message of any kind whatsoever needs to be exchanged between the various equipments. Reconfiguration is therefore effected locally and without external intervention, where it is necessary. Protection is therefore applied with optimum speed.

If an add/drop module MIE1 or MIE2 again detects traffic on the connection that it is observing, it sends the two action modules MA1 and MA2, using the coupling means MC2 or MC3, local instructions telling them to change state, i.e. to go from their second or add/drop state to their first transit state (shown in FIG. 2). The two action modules MA1 and MA2 are then again able to regenerate conjointly the signals at the second wavelength λs coming from the fibers F1 and F2 and the two add/drop modules MIE1 and MIE2 are again both ready to exercise their function of adding/dropping signals at the first wavelength λw.

As previously indicated, an equipment may be connected to equipments with which it exchanges signals at different wavelengths. For example, an equipment may be connected by first optical fiber portions to another equipment so as to exchange therewith signals at a first wavelength and by the second optical fiber portions to a further equipment so as to exchange therewith signals at a third wavelength. Alternatively, an equipment may be connected by the first (or second) optical fiber portions to two other optical equipments to exchange signals with them at first and third wavelengths, respectively. In these situations, each add/drop module MIE is adapted accordingly as a function of the wavelength that it must manage.

Moreover, the working and standby wavelengths may assume values that are all different or not, but in the former case they must be chosen so that different signals never propagate simultaneously in the same medium, in the same direction, and at the same wavelength.

The add/drop modules MIE, distribution modules MR and action modules MA of the network equipment N according to the invention may be implemented by conventional means: electronic circuits, optical or optoelectronic circuits, software (or data processing) modules, or a combination of circuits and software.

The invention also provides a method of transmitting signals within a WDM ring network comprising network equipments Ni connected two by two to opposite ends of optical fibers F1 and F2 dedicated to the transportation of multiplexed signals in opposite directions.

The latter may be implemented with the aid of the network equipment N described hereinabove in particular. The main and optical functions and subfunctions provided by the steps of this method being substantially identical to those provided by the various means constituting the network equipment N, only the steps implementing the main functions of the method are summarized hereinafter.

The method consists, when a network equipment Ni detects a signal transmission interruption, having a first wavelength λw on a first portion of optical fibers F1 and F2 to which it is connected, transmitting to a second portion of these optical fibers F1 and F2, opposite the first portion, at a second wavelength λs, the signals that it receives from a terminal T, and transmitting to the terminal T the signals that are addressed to it and that come from the second portion of optical fibers at the second wavelength λs.

The network equipments Ni are incidentally by default in a first transit signal state in order to allow the signals at the second wavelength λs to circulate in the optical fibers F1 and F2.

The invention is not limited to the network equipment and WDM ring network embodiments described hereinabove by way of example only, but encompasses any variants thereof within the scope of the following claims that the person skilled in the art might envisage.

There is claimed:

1. Wavelength division multiplex ring communication network equipment comprising a first multiplexer connected to a first optical fiber portion dedicated to transporting multiplexed signals and a second multiplexer connected to a second optical fiber portion, said equipment comprising signal protection means connected to said first and second multiplexers and to a terminal and which, in the event of local detection of interruption of signal transmission at a first wavelength on said first optical fiber portion, send the signals coming from said terminal to said second multiplexer at a second wavelength that is different from said first wavelength, so that it communicates them to said second optical fiber portion, and to transmit to said terminal the signals that are addressed to it and that come from said second optical fiber portion at said second wavelength, which signal protection means comprise:

signal distribution means connected to said terminal, first and second action means connected to said signal distribution means and to said first and second multiplexers, respectively, and which assume a first or transit state or a second or add/drop state for adding/dropping signals at said second wavelength as a function of local state instructions, said action means assuming by default their first transit state, and first add/drop means for signals at said first wavelength, connected to said signal distribution means, said first multiplexer, and said first and second action means, and which, in the event of local detection of signal interruption, send said first and second action means local state instructions so that they assume said second add/drop state.

2. The equipment claimed in claim 1 wherein said signal protection means comprise:

first coupling means for connecting said first signal add/drop means to said first and second action means so as to transmit selectively to them said local state instructions, second coupling means for connecting said first and second action means to each other so that they are able to communicate to each other signals to be regenerated, and third coupling means for connecting said distribution means to said first add/drop means and to said first and second action means, for the exchange of signals between said terminal and said optical fiber portions via said first and second multiplexers, respectively.

3. The equipment claimed in claim 1 wherein said signal protection means, in the event of local detection of signal transmission interruption at a third wavelength on said second optical fibers portion, transmit to the first multiplexer at a fourth wavelength the signals coming from said terminal so that it communicates them to said first portion of optical fiber, and to transmit to said terminal the signals that are addressed to it and come from said first portion of optical fiber at said fourth wavelength.

4. The equipment claimed in claim 3 wherein said signal protection means comprise second signal add/drop means for adding/dropping the third wavelength connected to said signal distribution means, to said second multiplexer, and to said first and second action means and which, in the event of local detection of interruption of transmission of a signal at the third wavelength, send said first and second action means local state instructions so that they assume said second add/drop state.

5. The equipment claimed in claim 4 wherein said signal protection means comprise fourth coupling means for connecting said second signal add/drop means to said first and second action means so as to transmit selectively to them said local state instructions.

6. The equipment claimed in claim 3 wherein said third wavelength is identical to said first wavelength.

* * * * *